United States Patent
Rostvall

[11] Patent Number: 5,583,639
[45] Date of Patent: Dec. 10, 1996

[54] OPTICAL DEVICE FOR CHECKING THE FLATNESS AND SMOOTHNESS OF A SURFACE

[75] Inventor: Tomas Rostvall, Hägersten, Sweden

[73] Assignee: Ingenjorsfirman Tomas Rostvall, Hagersten, Sweden

[21] Appl. No.: 295,871

[22] PCT Filed: Mar. 11, 1993

[86] PCT No.: PCT/SE93/00216

§ 371 Date: Dec. 19, 1994

§ 102(e) Date: Dec. 19, 1994

[87] PCT Pub. No.: WO93/19345

PCT Pub. Date: Sep. 30, 1993

[30] Foreign Application Priority Data

Mar. 19, 1992 [SE] Sweden ................... 9200846

[51] Int. Cl.$^6$ ........................................ G01B 9/02
[52] U.S. Cl. ................ 356/360; 356/73; 356/359
[58] Field of Search .................. 356/72, 73, 359, 356/360

[56] References Cited

U.S. PATENT DOCUMENTS 4,715,709  12/1987  Sekine et al. .
4,854,708   8/1989  Kafri et al. ................... 356/73

FOREIGN PATENT DOCUMENTS 2218199  11/1989  United Kingdom .

Primary Examiner—Samuel A. Turner
Assistant Examiner—Robert Kim
Attorney, Agent, or Firm—Burns, Doane, Swecker & Mathis, L.L.P.

[57] ABSTRACT

Device for checking of flatness and smoothness of an item (10) comprising components for measuring of flatness with an interference method and for measuring of smoothness with a reflection method, where the item (10) or a mirror (23) close to the item can be tilted in two directions until stripes of an interference pattern created on a first image plane (14) have a predetermined distance and a predetermined general direction, the deviations from flatness being calculated from the distance and curvature of the stripes, and the smoothness being calculated from the brightness variations in the mirror image created by the reflection method on a second image plane (22).

18 Claims, 1 Drawing Sheet

OPTICAL DEVICE FOR CHECKING THE FLATNESS AND SMOOTHNESS OF A SURFACE

BACKGROUND OF THE INVENTION

It is previously known to measure the flatness of polished metal surfaces by interference methods or by reflection methods. Both methods have specific limitations which makes it difficult to fully utilize them. The present invention combines both methods, which improves the accuracy and is easier to automatize than either method alone.

Interference methods utilize preferably monochromatic light, which is split in two optical rays, one reflected from the surface to be measured and the other reflected from a high quality flat reference surface. The two optical rays are merged and form an interference pattern of dark and light stripes, where the distance between stripes is reversely proportional to the angular misalignement and the ratio between the curvature of the stripes and their distance is proportional to the height profile. A limitation with interference methods is that if the angles in the optical paths are chosen to give great distance between stripes, the height profile can be measured with high accuracy but only along a few lines on the surface, and if the angles are chosen to give shorter distances between stripes, the height profile can be measured along several lines on the surface but with lesser accuracy. There is a considerable risk of overlooking local defects.

Reflection methods illuminate the surface from a point source of light, and in an image plane there is a continuous two-dimensional light distribution related to the flatness deviations for all points of the surface. The light distribution can be converted by mathemathical methods to a map of the deviation from flatness, and local smoothness defects such as scratches and grinding marks are clearly visible. For the mathematical conversion it is important to know the angular alignment of the surface very accurately.

SUMMARY

According to the invention an interference method is used to orient the surface with high accuracy and to give a general view of skewness and bulging of the surface, and thereafter a reflection method to give a detailed overall picture of grinding marks, scratches and other local deviations from smoothness. A device employing a combination of both methods will give comprehensive and accurate information about the flatness and smoothness deviation of the surface, and can be automated for checking large numbers of items from a production line.

BRIEF DESCRIPTION OF THE DRAWINGS

FIG. 1 shows a device where the item (10) to be checked is directly illuminated by a laser light source (11) as well as a non-coherent light source (21), and FIG. 2 shows a device where the light sources illuminate a virtual image (24) created by reflection of the real item (20).

DETAILED DESCRIPTION OF PREFERRED EMBODIMENTS

Figure 1:
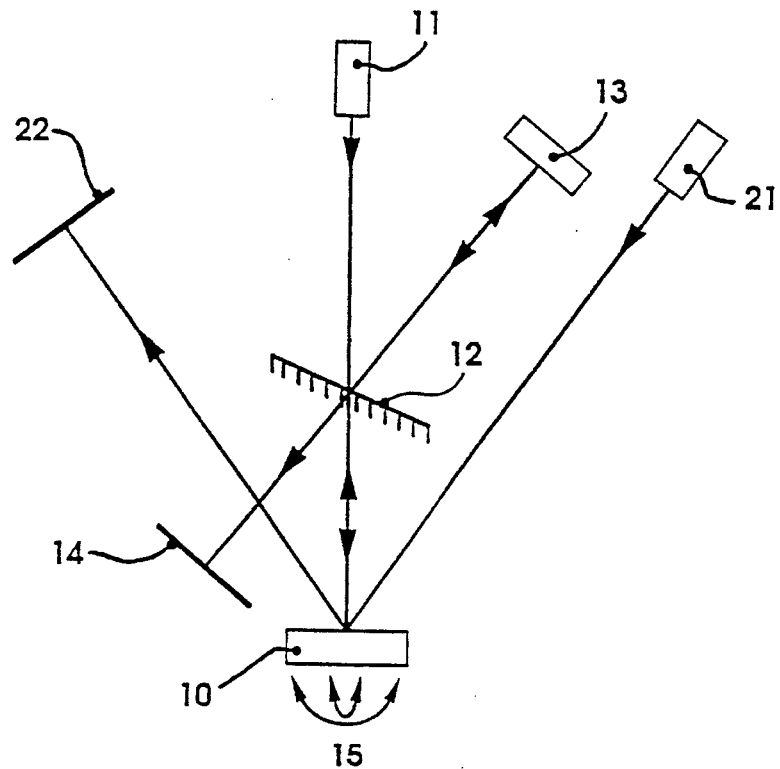
FIGS. 1 and 2 indicate in principle the location of the components employed, relative to the surface of the item to be checked.

The laser light source (11) forms part of a laser interferometer also comprising a semi-transparent mirror (12), a reference surface (13) and a first image plane (14). The reference surface (13) can be an approved item of the same kind as the item (10) to be checked, or some other master surface of the desired shape. The laser beam is split by the semi-transparent mirror (12) into two rays, a first ray travelling from the laser light source (11) to the mirror (12), to the reference surface (13), through the mirror (12) to the image plane (14). The second ray travels from the laser light source (11) through the mirror (12) to the item (10), to the mirror (12) and to the image plane (14), where the two rays interfere to create a pattern of dark and light stripes. The distance between stripes depends on the distance between the points on the mirror (12) intersected by a normal to the surface of the item (10) and a normal to the reference surface (13), the distance between stripes becoming very large when the points on the mirror (12) coincide. The general direction of the stripes depends on how much the normal to the surface of the item (10) deviates from a plane containing the normal to the reference surface (13). The ratio of the curvature of the stripes to their distance indicates profile of height deviations between the item (10) and the reference surface (13). The item to be checked (10) is held in the device with tilting possibilities in two directions (15). The first image plane (14) is preferably the detector surface of a video camera, or a screen observed with a video camera. The item (10) is tilted by angular motion in two directions (15) until a predetermined number of stripes, at least two, are visible in the first image plane (14), and until these have a predetermined general direction, preferably horizontal. When this is the case, the surface of the item (10) has a well defined orientation. The curvature of the stripes can be directly interpreted as deviations from flatness and gives a clear picture of skewness, bulging, major grooves and other macroscopic defects which can be related to specific points on the surface along the stripes.

The surface of the item is also illuminated by a light source (21), preferably a small non-coherent light source such as an intense point lamp. Its light is reflected in the surface of the item (10) and strikes a second image plane (22) where a bright mirror image of the item is visible. At reflection, light reflected by surface elements with wrong orientation will strike the second image plane (22) in other points than the intended points. Skewness and bulging result in brightness variations which can be measured and mathematically converted to a comprehensive picture of the whole surface. Small scratches, pores, grinding marks and other local smoothness defects with large angular errors will reflect light to points outside the mirror image and will be clearly visible as dark spots in the image. To relate defects to the actual parts of the surface of the item (10) and to facilitate mathematical conversion, the item (10) must be very accurately oriented, which is assured by use of the interference method as above. The second image plane (22) is preferably the detector surface of a video camera or a screen observed by a video camera.

Figure 2:
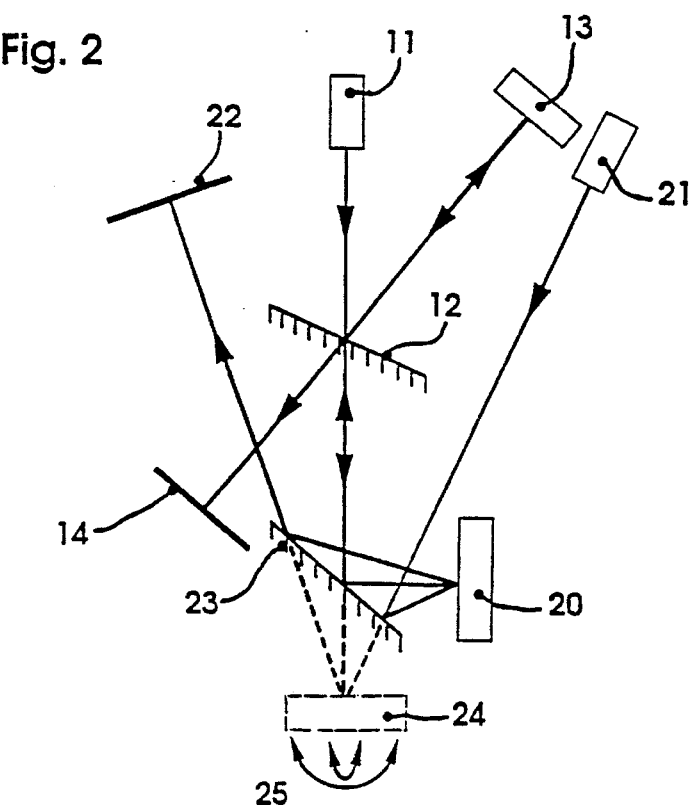

FIG. 2 shows a device according to the invention, where the light paths are directed to a virtual image (24) created by reflection of the item (20) to be checked in a mirror (23). The virtual image (24) can be tilted in two directions (25) until the a predetermined number of stripes, at least two, are visible in the pattern of stripes on a first image plane (14) with a predetermined general direction. The virtual image (24) is tilted either by tilting the real item (20) or by tilting the mirror (23). When the items are difficult to handle by reason of their shape or size, tilting of the mirror is preferable.

By automatic measuring of the distance between stripes and their general direction in a first image plane (14) and by letting the measurement results guide a mechanism for tilting the item (10,20) or the tiltable mirror (23), the process of checking an item for deviations from flatness and smoothness can be made much faster and more accurate. The deviations are presented in two ways, as figures for skewness and bulging calculated from the stripe curvature of the interference method, and as a map of scratches, pores and grooves derived with the reflection method. Both presentations of the deviations can be used for automatic classification of items as approved and rejected, or as a base for statistics.

The device can within the concept of the invention be modified by introduction of further mirrors in the optical paths, or by other known arrangements of the components for the interference method.

I claim:

1. A device for checking flatness and smoothness of a surface of an item comprising:

means for measuring the flatness with an interference method;

means for measuring the smoothness with a reflection method; and means for orienting the item with respect to a reference plane in accordance with a distance and general direction of stripes created by the interference method before determining the smoothness with the reflection method.

2. The device according to claim 1, wherein the orienting means include means to tilt the item in two directions until stripes with a predetermined distance and a predetermined general direction are created on a first image plane by the interference method.

3. A device according to claim 2, wherein the number of stripes created by the interference method being at least two.

4. The device according to claim 3, further comprising means for automatic measuring of distance and direction of the stripes on the first image plane.

5. The device according to claim 1, wherein the measuring is done against a virtual image which is a mirror image in a mirror of the item to be checked.

6. A device according to claim 5, further comprising means for tilting the virtual image by tilting in at least one direction of the mirror reflecting the item, until stripes with a predetermined distance and a predetermined general direction are created on a first image plane.

7. The device according to claim 6, further comprising means for automatic measuring of the distance and general direction of the stripes on the first image plane and a mechanism for tilting the mirror in response to the measurement results until the stripes have the predetermined distance and direction.

8. The device according to claim 2, wherein the components for measuring with an interference method comprise a laser light source and a reference surface.

9. The device according to claim 2, wherein the components far measuring with an interference method comprise a laser light source, a reference surface and means for measuring the distance and general direction of stripes in an interference pattern created on a first image plane.

10. The device according to claim 2, wherein the components for measuring with a reflection method comprise a high intensity light source and a second image plane.

11. The device according to claim 5, wherein the components for measuring with an interference method comprise a laser light source and a reference surface.

12. The device according to claim 5, wherein the components for measuring with an interference method comprise a laser light source, a reference surface and means for measuring the distance and general direction of stripes in an interference pattern created on a first image plane.

13. The device according to claim 5, wherein the components for measuring with a reflection method comprises a high intensity light source and a second image plane.

14. A method for checking flatness and smoothness of a surface of an item, comprising the steps of:

measuring the flatness of the surface with an interference method;

orienting the item with respect to a reference plane by using a distance and general direction of stripes created by the interference method; and after orienting the item, measuring the smoothness of the surface with a reflection method.

15. The method of claim 14, wherein the orienting step includes tilting the item in two directions until the stripes have a predetermined distance and direction on a first image plane.

16. The method of claim 14, wherein a virtual image in a mirror is measured.

17. The device according to claim 1, wherein the orienting means orients the item to maintain the stripes in a substantially horizontal position.

18. The method of claim 14, wherein the item is oriented to maintain the stripes in a substantially horizontal position.

* * * * *